(No Model.) 2 Sheets—Sheet 1.
R. H. INGRAHAM.
BAKING PAN.
No. 534,957. Patented Feb. 26, 1895.
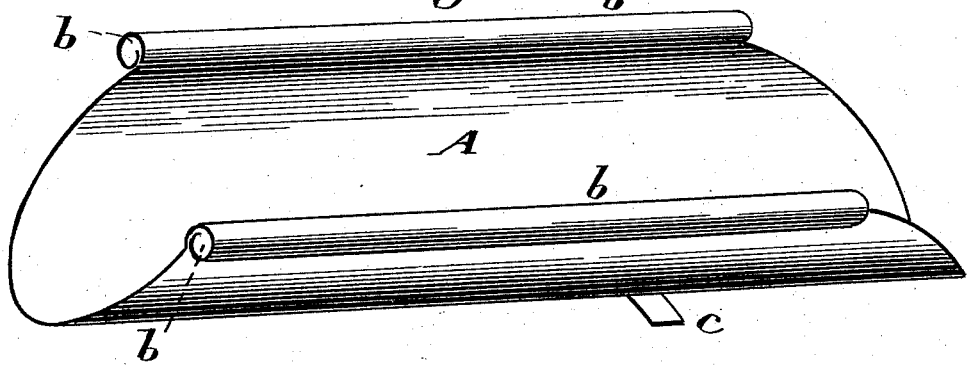
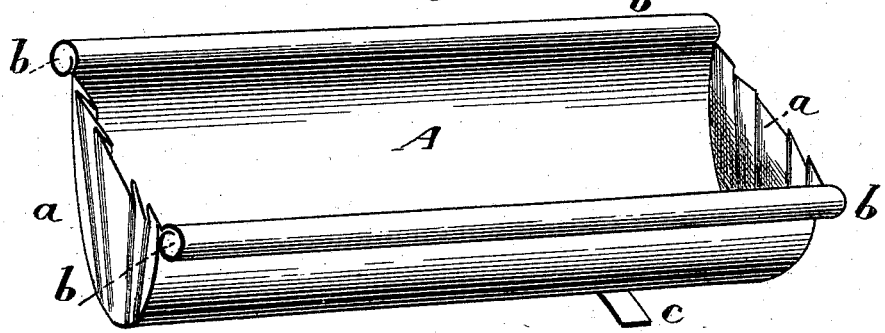
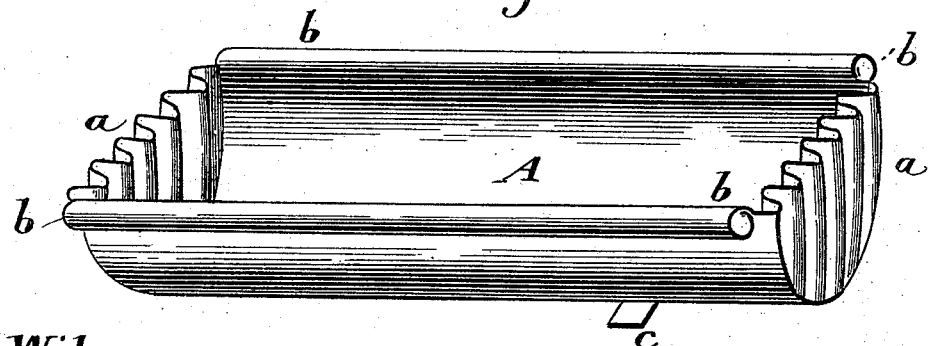
Witnesses:
A. Ruppert.
Chas. A. Place.
Inventor:
Rollin H. Ingraham,
by G. H. W. T. Donald
atty (No Model.) 2 Sheets—Sheet 2.

R. H. INGRAHAM.
BAKING PAN.

No. 534,957. Patented Feb. 26, 1895.

Witnesses:
A. Ruppert.
Chas. A. Place.

Inventor:
Rollin H. Ingraham
by [signature] atty

UNITED STATES PATENT OFFICE.

ROLLIN H. INGRAHAM, OF NILES, OHIO.

BAKING-PAN.

SPECIFICATION forming part of Letters Patent No. 534,957, dated February 26, 1895.

Application filed September 27, 1894. Serial No. 524,267. (No model.)

*To all whom it may concern:*

Be it known that I, ROLLIN H. INGRAHAM, of Niles, in the county of Trumbull and State of Ohio, have invented certain new and useful Improvements in Baking-Pans, of which the following is a specification, reference being had to the accompanying drawings and to the letters of reference marked thereon.

The object of my invention is to furnish a baking pan the bottom and sides of which shall form one continuous curved surface, which will allow the formation of a maximum amount of crust of the material baked, and but a minimum amount of contact with the surface of the oven; and which shall have strength and stiffness, and be adapted for ready removal from the oven.

Figure 4:
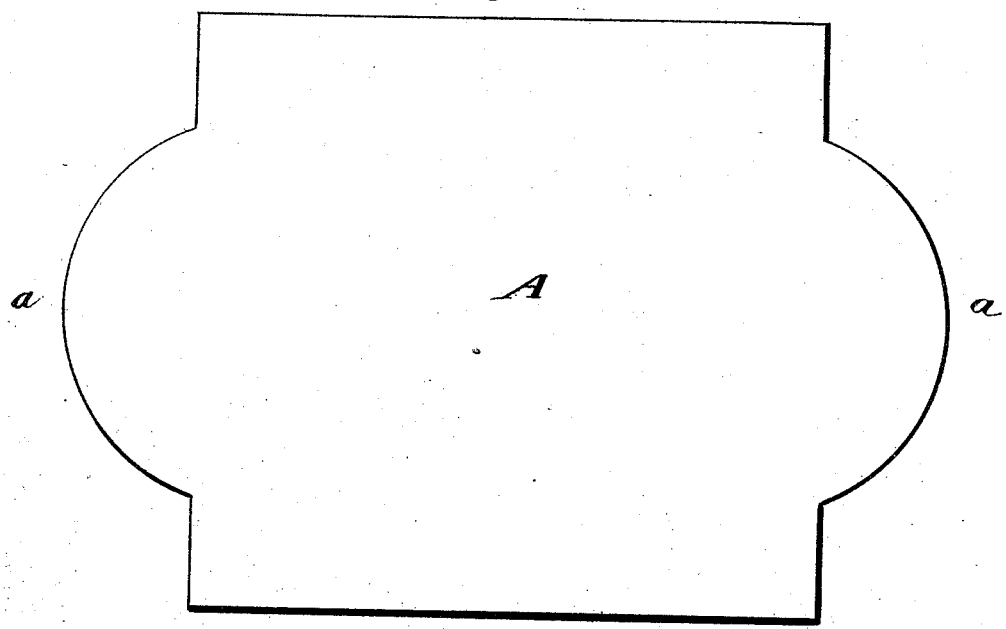
Figure 5:
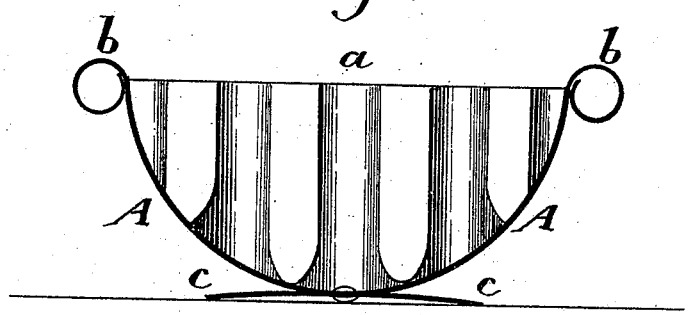

In the drawings, Figure 1 is a perspective view of one form of my improved baking pan. Fig. 2 is a similar view of a modified form. Fig. 3 is a similar view of a further modification. Fig. 4 shows the blank from which the pan of the last named construction is formed. Fig. 5 is a cross section of the pan shown in Fig. 3.

A is the pan, the shape of which is such that the sides and bottom form one continuous curved surface.

In Fig. 1, the pan is without ends, the dough being sufficiently stiff to be baked without the requirement of ends to the pan.

In Fig. 2, the pan is provided with ends $a$ having plain surfaces. In Fig. 3, the ends $a$ are corrugated in such a manner as to take up the surplus metal of the blank, Fig. 4, and also to furnish an increased surface for making crust.

In all forms of the pan, as here shown, the edges of the sides are rolled into hollow beads $b$ which materially strengthen the pan and prevent too close placing of a series of pans in the oven. The hollow beads also furnish sockets into any one of which the end of a poker or other device, may be inserted for the ready removal of the pan from the oven. The round or curved bottom gives the least possible contact with the oven, thereby diminishing the danger of burning the material baked.

The pan is provided with a foot $c$, by means of which it is kept upright in the oven.

The invention furnishes a baking pan which is strong, cheaply constructed and effective in operation.

Having described my invention, I claim—

1. A baking pan, made from a single piece of metal, with one continuous curved surface formed by the bottom and sides, and with corrugated ends, and means for its support, substantially as set forth.

2. A baking pan, made from a single piece of metal, with one continuous curved surface formed by the bottom and sides, and having rolled beads on the edges of the sides and corrugated ends, substantially as set forth.

In testimony whereof I hereunto set my hand and seal.

ROLLIN H. INGRAHAM. [L. S]

Witnesses:
JOHN H. WILSON,
CHARLES H. STROCK.